United States Patent
Ishigo

(10) Patent No.: US 8,696,209 B2
(45) Date of Patent: Apr. 15, 2014

(54) CONNECTING ROD BEARING OF INTERNAL COMBUSTION ENGINE

(75) Inventor: Osamu Ishigo, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 13/597,627

(22) Filed: Aug. 29, 2012

(65) Prior Publication Data

US 2013/0064486 A1   Mar. 14, 2013

(30) Foreign Application Priority Data

Sep. 8, 2011   (JP) .................... 2011-195543

(51) Int. Cl.
   *F16C 33/10*   (2006.01)
(52) U.S. Cl.
   USPC .......................................... 384/288
(58) Field of Classification Search
   USPC ................................ 384/288, 294, 291
   See application file for complete search history.

(56) References Cited

U.S. PATENT DOCUMENTS

| | | | | |
|---|---|---|---|---|
| 8,147,144 B2* | 4/2012 | Ishigo et al. | ................ | 384/288 |
| 8,408,799 B2* | 4/2013 | Ishigo et al. | ................ | 384/288 |
| 2010/0316313 A1* | 12/2010 | Ishigo et al. | ................ | 384/288 |
| 2011/0243486 A1* | 10/2011 | Ukai et al. | ................ | 384/288 |

FOREIGN PATENT DOCUMENTS

| | | |
|---|---|---|
| JP | 08-277831 | 10/1996 |
| JP | 2005-069283 | 3/2005 |
| JP | 2009-174697 | 8/2009 |
| JP | 2010-196871 | 9/2010 |
| JP | 2011-058567 | 3/2011 |
| WO | WO 2009/128538 | 10/2009 |

OTHER PUBLICATIONS

Office Action issued Jul. 19, 2013 in corresponding Japanese Patent Application Serial No. 2011-195543 (two pages) (English translation not available).
Office Action issued Jan. 31, 2014 in corresponding Japanese Patent Application Seral No. 2011-195543 (two pages) (English translation not available).

* cited by examiner

*Primary Examiner* — Thomas R Hannon
(74) *Attorney, Agent, or Firm* — Harness, Dickey & Pierce, P.L.C.

(57) ABSTRACT

Disclosed is a connecting rod bearing for a crankshaft of an internal combustion engine, the connecting rod bearing comprising a pair of semi-cylindrical bearings. In at least one of the semi-cylindrical bearings, a front side circumferential groove is formed from the front side circumferential end surface, and in the opposed semi-cylindrical bearing, a rear side circumferential groove is formed from the rear side circumferential end surface. In a communicating portion where the front side circumferential groove, the rear side circumferential groove, and the axial groove communicate with one another, a depth of the front side circumferential groove is larger than a depth of the rear side circumferential groove, whereby a step portion in a depth direction of the circumferential grooves is formed.

11 Claims, 6 Drawing Sheets

CONNECTING ROD BEARING OF INTERNAL COMBUSTION ENGINE

INCORPORATION BY REFERENCE

The present application claims priority from JP Patent Application Ser. No. 2011-195543 filed on Sep. 8, 2011, the content of which is hereby incorporated by reference into this application.

BACKGROUND OF THE INVENTION (1) Field of the Invention

The present invention relates to a connecting rod bearing (i.e. a slide bearing) for internal combustion engines, which rotatably supports a crankpin connecting a connecting rod and a crankshaft, wherein lubricant oil is supplied to an inner surface of a main bearing, which supports the crankshaft, and further to an inner surface of the connecting rod bearing through an internal lubricant-oil passage formed in the crankshaft.

(2) Related Art

A crankshaft of an internal combustion engine is supported in a lower section of a cylinder block of the internal combustion engine at a journal section thereof through a main bearing consisting of a pair of semi-cylindrical bearings. In the main bearing, lubricant oil discharged from an oil pump is fed into an oil groove, being formed on the inner surface of the main bearing, through an oil gallery formed in the cylinder block wall and a through hole formed in the main bearing wall. A first lubricant-oil passage is diametrically formed through the journal section, and openings at the both ends of the first lubricant-oil passage are in fluid communication with the oil groove. Further, a second lubricant-oil passage is formed in the crankshaft so as to branch off from the diametrical first lubricant-oil passage in the journal section to go through a crank arm, which second lubricant-oil passage is in fluid communication with a third lubricant-oil passage diametrically formed through a crankpin. Thus, the lubricant oil fed from the oil gallery in the cylinder block wall via the through hole formed in the main bearing wall into the oil groove formed on the inner surface of the main bearing flows through the first, second and third lubricant-oil passages, and be supplied between sliding surfaces of the crankpin and a connecting rod bearing from outlet ports at both ends of the third lubricant-oil passage (which is a lubricant-oil outlet port existing on the surface of the crankpin).

The lubricant oil fed from the cylinder block of the internal combustion engine through the journal section of the crankshaft to the connecting rod bearing might carry foreign substances remaining in the respective lubricant-oil passages. If such foreign substances entrained by the lubricant oil are fed between the crankpin and the connecting rod bearing, there is a risk that the foreign substances damage the sliding surface of the connecting rod bearing. Thus, it is needed to quickly discharge the foreign substances from the sliding surface of the crankpin and the connecting rod bearing to outside.

As a countermeasure against the foreign substances accompanied with the lubricant oil, there has been a proposal to discharge the foreign substances by providing a circumferential oil groove throughout the entire circumferential length of the inner surface of one of the semi-cylindrical bearings of the main bearing which consists of a pair of the semi-cylindrical bearings and which supports the journal section of the crankshaft, the one of the semi-cylindrical bearings having a through hole which directly receives the lubricant oil supplied from the oil gallery in the cylinder block wall. When the above idea is applied to the connecting rod bearing, however, it was confirmed by an experiment that not only the foreign substance discharge effect is obtainable but also the proposed way is counterproductive since the foreign substances remain in the circumferential oil groove formed throughout the entire circumferential length of the inner surface of the semi-cylindrical bearing of the connecting rod bearing, and are dispersed throughout the sliding surface of the bearing thereby becoming liable to damage the bearing.

This is because in general a housing, which holds the connecting rod bearing, is considerably deformed during engine operation, so that a clearance between the crankpin and the connecting rod bearing during the engine operation is larger than a clearance between the journal section of the crankshaft and the main bearing, so that the foreign substances remaining in the oil groove are liable to be dispersed throughout the sliding surface of the bearing including "a circumferential center section of the semi-cylindrical bearing" as a primary load receiving section. Such a connecting rod bearing suffers increased damages as compared with a conventional connecting rod bearing without such a circumferential oil groove. This was confirmed by an experiment.

Therefore, in order to discharge foreign substances flowing onto the sliding surface of the connecting rod bearing together with the lubricant oil from the lubricant-oil outlet port on the crankpin surface, the present inventor has proposed the connecting rod bearing in which at least in one of a pair of semi-cylindrical bearings constituting the connecting rod bearing, a front side circumferential groove is formed along the bearing inner circumferential surface from the front side circumferential end surface which is positioned at a front side with respect to the rotational direction of the crankpin, and the axial groove which communicates with the front side circumferential groove is formed throughout the entire length of the width in the axial direction along the bearing inner circumferential surface (JP-A-2009-174697). According to the configuration, the foreign substances accompanying the lubricant oil supplied from the lubricant-oil outlet port located on the outer surface of the crankpin are caught by the front side circumferential groove, and are fed to the vicinity of the circumferential end surface together with the lubricant oil along the front side circumferential groove. Subsequently, the foreign substances are blocked by the circumferential end surface of the opposed semi-cylindrical bearing, and the foreign substances are prevented from flowing onto the sliding surface of the opposed semi-cylindrical bearing. The foreign substances blocked by the circumferential end surface of the opposed semi-cylindrical bearing flow into the axial groove and are discharged to the outside of the bearing.

In the internal combustion engines of recent years, oil pumps have been miniaturized in order to reduce fuel consumption, the amounts of the lubricant oils supplied to the bearing sliding surfaces have been reduced as compared with the conventional internal combustion engines, and shortage of supply of the lubricant oil to the bearing sliding surface have occurred.

Excellence in foreign substance discharging property and excellence in suppliability of the lubricant oil onto the bearing sliding surface are required for the connecting rod bearings of internal combustion engines.

In order to enhance suppliability of the lubricant oil to the bearing sliding surface, it is also conceivable to provide a circumferential groove in the same shape as the front side circumferential groove, along the bearing inner circumferential surface from the butted circumferential end surface in the opposed semi-cylindrical bearing, as shown in FIGS. 13 and 14, in addition to the aforementioned front side circumferential groove. According to the configuration, the amount of the lubricant oil supplied to the bearing sliding surface of the opposed semi-cylindrical bearing can be increased, but the foreign substance discharging property is reduced in some degree.

Here we would raise the following patent publications of the related art:

1. JP-A-8-277831
2. JP-A-2005-69283
3. JP-A-2009-174697

BRIEF SUMMARY OF THE INVENTION

An object of the present invention is to provide a connecting rod bearing which is capable of quickly discharging foreign substances accompanying a lubricant oil which is fed onto the connecting rod bearing via a journal section of a crankshaft from a cylinder block of an internal combustion engine, from the connecting rod bearing, and further is excellent in suppliability of the lubricant oil to the bearing sliding surface.

In the light of the above object, according to one aspect of the present invention, the following connecting rod bearing for a crankshaft of an internal combustion engine is provided.

A connecting rod bearing for a crankshaft of an internal combustion engine which rotatably supports a crankpin of a crankshaft having an internal lubricant-oil passage, wherein the connecting rod bearing is constituted of a pair of semi-cylindrical bearings, the pair of semi-cylindrical bearings each having a front side circumferential end surface positioned at a front side with respect to a rotational direction of the crankpin, and a rear side circumferential end surface positioned at a rear side, the front side circumferential end surface of one of the semi-cylindrical bearings and the rear side circumferential end surface of the other one of the semi-cylindrical bearings abutting on each other, in at least one of the semi-cylindrical bearings, a front side circumferential groove being formed along a bearing inner circumferential surface from the front side circumferential end surface within a range of a maximum central angle of 45 degrees, in the opposed semi-cylindrical bearing, a rear side circumferential groove which communicates with the front side circumferential groove being formed along a bearing inner circumferential surface from the rear side circumferential end surface within a range of a maximum central angle of 45 degrees, an axial groove which communicates with the front side circumferential groove and the rear side circumferential groove being formed throughout an entire length of a width in an axial direction along the bearing inner circumferential surface, and in a communicating portion where the front side circumferential groove, the rear side circumferential groove, and the axial groove communicate with one another, a depth of the front side circumferential groove being larger than a depth of the rear side circumferential groove, whereby a step portion in a depth direction of the circumferential grooves is formed.

In one embodiment of the present invention, in the communicating portion, the depth (D2) of the rear side circumferential groove is 0.2 to 0.9 times as large as the depth (D1) of the front side circumferential groove.

In this case, the depth of the circumferential groove is a distance from the bearing inner circumferential surface to the groove bottom. In regard with the portion where the axial groove is present, the depth is a distance from the bearing inner circumferential surface to the groove bottom when it is assumed that the axial groove is absent.

In another embodiment of the present invention, in the communicating portion, the depth of the front side circumferential groove, the depth of the rear side circumferential groove, and a depth of the axial groove satisfy the following relational expression:

the depth (D1) of the front side circumferential groove>the depth (D3) of the axial groove>the depth (D2) of the rear side circumferential groove.

In this case, the depth of the axial groove is a distance from the bearing inner circumferential surface to the groove bottom when it is assumed that the axial groove is absent.

In still another embodiment of the present invention, in the communicating portion, a groove sectional area of the front side circumferential groove seen from a circumferential direction of the connecting rod bearing is larger than a groove sectional area of the axial groove seen from an axial direction of the connecting rod bearing.

In yet another embodiment of the present invention, in the communicating portion, a groove width of the front side circumferential groove is larger than a groove width of the rear side circumferential groove, whereby a step portion in a groove width direction of the circumferential grooves is formed.

In still another embodiment of the present invention, a central angle at which the front side circumferential groove is formed is larger than a central angle at which the rear side circumferential groove is formed.

In yet another embodiment of the present invention, the axial groove is formed by cutting at least either one of a bearing inner circumferential surface side of the front side circumferential end surface in which the front side circumferential groove is formed, or a bearing inner circumferential surface side of the rear side circumferential end surface in which the rear side circumferential groove is formed.

In still another embodiment of the present invention, the depth of the front side circumferential groove becomes gradually smaller as the front side circumferential groove is apart from the front side circumferential end surface.

In yet another embodiment of the present invention, the front side circumferential groove is formed in only one of the semi-cylindrical bearings.

In still another embodiment of the present invention, the front side circumferential grooves are formed in both of the semi-cylindrical bearings.

According to a second aspect of the present invention, an internal combustion engine including the above described connecting rod bearing is provided.

By adopting the configuration of the present invention, the connecting rod bearing is provided, which is capable of quickly discharging foreign substances accompanying the lubricant oil fed to the connecting rod bearing from the connecting rod bearing, and is excellent in suppliability of the lubricant oil to the bearing sliding surface.

DETAILED DESCRIPTION OF THE INVENTION

Herein below, referring to the accompanying drawings, there will be provided a description of some embodiments of the present invention.

Figure 1:
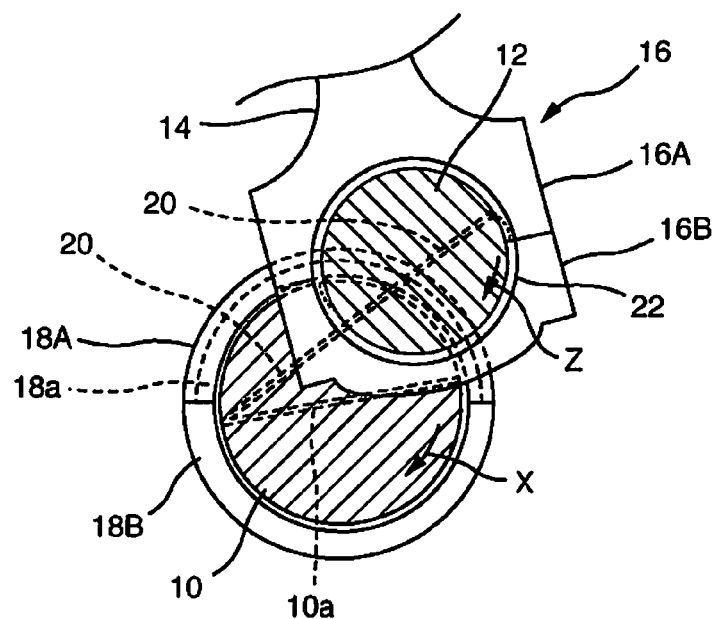
FIG. 1 is a schematic view of a crankshaft of an internal combustion engine sectioned in a journal section and a crankpin section.

FIG. 1 is a schematic view of a crankshaft of an internal combustion engine sectioned in a journal section and a crankpin section, respectively, in which 10 denotes a journal, 12 a crankpin and 14 a connecting rod. With regard to a positional relationship among these three members in the vertical direction to the drawing sheet, the journal 10 is present in most backside of the drawing sheet, and the crankpin 12 is present in front side of the drawing sheet, wherein the crankpin 12 is surrounded by a big end housing 16 of the connecting rod 14 which carries a piston on the other end.

The journal 10 is supported in a lower portion of a cylinder block of the internal combustion engine through a pair of semi-cylindrical bearings 18A and 18B. The semi-cylindrical bearing 18A positioned on the upper side in the drawing is provided with an oil groove 18a on the inner surface throughout the circumferential entire length of the bearing 18A.

The journal 10 has a diametrically formed through hole 10a. When the journal 10 rotates in the direction of the arrow X, openings at the both ends of the through hole 10a alternately communicates with the oil groove 18a.

A lubricant-oil passage 20 is formed in the crankshaft through the journal 10, a crank arm (not-shown) and the crankpin 12.

The crankpin 12 is held by the big end housing 16 (which is constituted of a connecting rod side big end housing 16A and a cap side big end housing 16B) of the connecting rod 14 via a pair of semi-cylindrical bearings 24 and 26. The semi-cylindrical bearings 24 and 26 are assembled with but end surfaces thereof being butted to each other to form a cylindrical connecting rod bearing 22.

Embodiment 1

Figure 2:
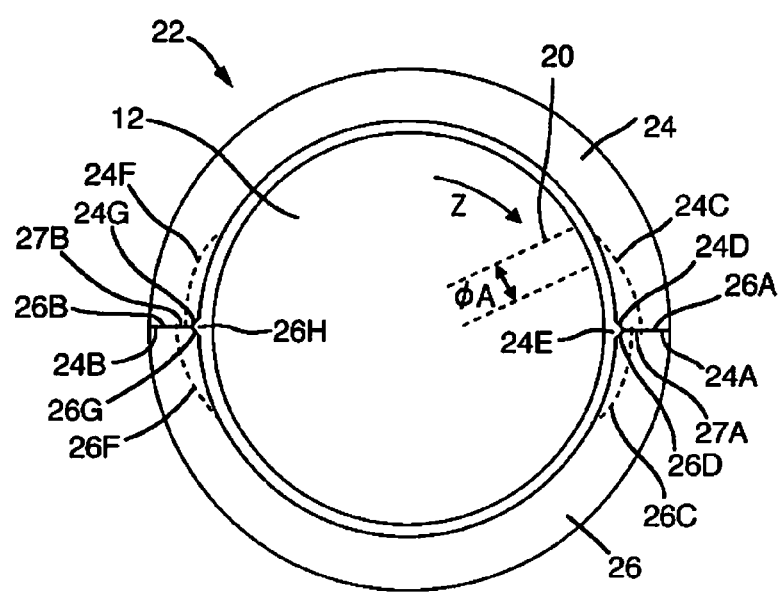
FIG. 2 is an elevation view of a connecting rod bearing according to embodiment 1 of the present invention.
Figure 3:
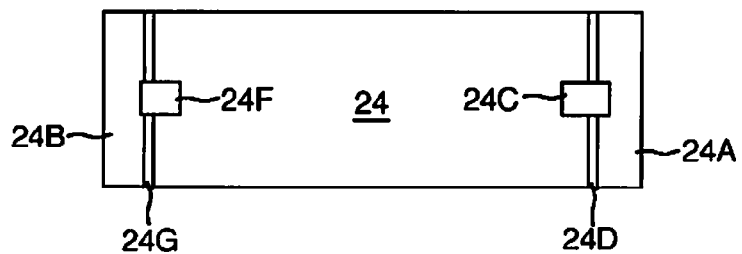
FIG. 3 is a plan view of one of semi-cylindrical bearings of the connecting rod bearing shown in FIG. 2 seen from an inner circumferential surface side.
Figure 4:
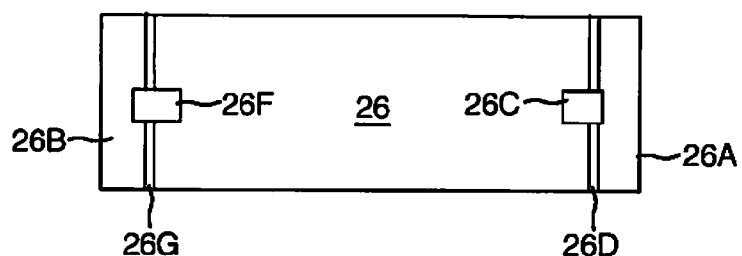
FIG. 4 is a plan view of the other semi-cylindrical bearing of the connecting rod bearing shown in FIG. 2 seen from the inner circumferential surface side.

FIGS. 2 to 4 show the details of a pair of semi-cylindrical bearings 24 and 26 constituting the connecting rod bearing 22. The semi-cylindrical bearing 24 has a front side circumferential end surface 24A which is positioned at a front side with respect to a rotational direction Z of the crankpin 12, and a rear side circumferential end surface 24B which is positioned at a rear side. The semi-cylindrical bearing 26 has a front side circumferential end surface 26B which is positioned at the front side with respect to the rotational direction Z of the crankpin 12, and a rear side circumferential end surface 26A which is positioned at the rear side. The front side circumferential end surface 24A of the semi-cylindrical bearing 24 and the rear side circumferential end surface 26A of the semi-cylindrical bearing 26 abut on each other, and the front side circumferential end surface 26B of the semi-cylindrical bearing 26 and the rear side circumferential end surface 24B of the semi-cylindrical bearing 24 abut on each other.

In the semi-cylindrical bearing 24, a front side circumferential groove 24C is formed along the bearing inner circumferential surface from the front side circumferential end surface 24A within a range of a maximum central angle of 45 degrees. Further, in the semi-cylindrical bearing 26 which is opposed to the semi-cylindrical bearing 24, a rear side circumferential groove 26C is formed along the bearing inner circumferential surface from the rear side circumferential end surface 26A in a range of a maximum central angle of 45 degrees. The rear side circumferential groove 26C communicates with the front side circumferential groove 24C.

A position in a bearing width direction of the front side circumferential groove 24C is determined so that the lubricant oil which is supplied from an outlet port opening of the lubricant-oil passage 20 flows into the front side circumferential groove 24C. In the present embodiment, the positions in the bearing width direction of the front side circumferential groove 24C and the rear side circumferential groove 26C are determined so that center lines in a width direction of the front side circumferential groove 24C and the rear side circumferential groove 26C conform to a center of the outlet port opening of the lubricant-oil passage.

Further, a part of a bearing inner circumferential surface side of the front side circumferential end surface 24A of the semi-cylindrical bearing 24 is cut throughout the entire length of the width in the axial direction, and a slant surface 24D is formed. Further, a part of a bearing inner circumferential surface side of the rear side circumferential end surface 26A of the semi-cylindrical bearing 26 is cut throughout the entire length of the width in the axial direction, and a slant surface 26D is formed. In this manner, by the slant surface 24D and the slant surface 26D, an axial groove 24E is formed throughout the entire length of the width in the axial direction along the bearing inner circumferential surface. The axial groove 24E communicates with the front side circumferential groove 24C and the rear side circumferential groove 26C.

In the present embodiment, while the slant surfaces 24D and 26D are provided in both of the circumferential end surfaces 24A and 26A, the slant surface may be provided on only one of the circumferential end surfaces 24A and 26A.

Further, in the present embodiment, the slant surfaces 24D and 26D are formed into plane-symmetrical shapes with respect to the circumferential end surfaces, but may be formed into asymmetrical shapes by changing the cut dimension or the like.

Figure 5:
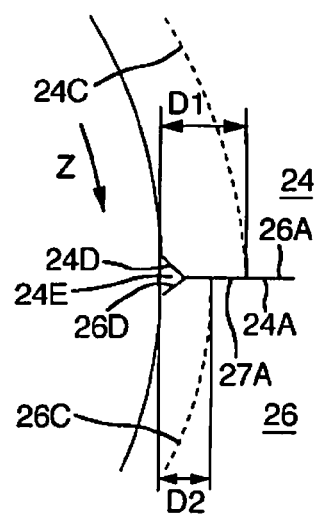
FIG. 5 is a view of a communicating portion of the connecting rod bearing shown in FIG. 2 from an axial direction.

FIG. 5 is a view of a communicating portion where the front side circumferential groove 24C, the rear side circumferential groove 26C, and the axial groove 24E communicate with one another seen from the axial direction. As also shown in FIG. 5, in the communicating portion where the front side circumferential groove 24C, the rear side circumferential groove 26C, and the axial groove 24E communicate with one another, a depth (D1) of the front side circumferential groove 24C in the front side circumferential end surface 24A is larger than a depth (D2) of the rear side circumferential groove 26C in the rear side circumferential end surface 26A, whereby a step portion 27A in a depth direction of the circumferential groove is formed.

In the present embodiment, similar circumferential grooves are formed in the other butted circumferential end surfaces. More specifically, in the semi-cylindrical bearing 26, a front side circumferential groove 26F is formed along the bearing inner circumferential surface from the front side circumferential end surface 26B within a range of a maximum central angle of 45 degrees. Further, in the semi-cylindrical bearing 24 which is opposed to the semi-cylindrical bearing 26, a rear side circumferential groove 24F is formed along the bearing inner circumferential surface from the rear side circumferential end surface 24B within a range of a maximum central angle of 45 degrees. The rear side circumferential groove 24F communicates with the front side circumferential groove 26F.

However, the circumferential grooves do not always have to be provided on both of the butt end surfaces. More specifically, the front side circumferential groove may be formed in only one of the semi-cylindrical bearings.

In the present embodiment, a part of a bearing inner circumferential surface side of the front side circumferential end surface 26B of the semi-cylindrical bearing 26 is cut throughout the entire length of the width in the axial direction, and a slant surface 26G is formed. Further, a part of a bearing inner circumferential surface side of the rear side circumferential end surface 24B of the semi-cylindrical bearing 24 is cut throughout the entire length of the width in the axial direction, and a slant surface 24G is formed. In this manner, by the slant surface 24G and the slant surface 26G, an axial groove 26H is formed throughout the entire length of the width in the axial direction along the bearing inner circumferential surface. The axial groove 26H communicates with the front side circumferential groove 26F and the rear side circumferential groove 24F.

In the present embodiment, while the slant surfaces 24G and 26G are provided on both of the circumferential end surfaces 24B and 26B, a slant surface may be provided on only one of the circumferential end surfaces 24B and 26B.

Further, in the present embodiment, the slant surfaces 24G and 26G are formed into plane-symmetrical shapes with respect to the circumferential end surfaces, but may be formed into asymmetrical shapes by changing the cut dimension or the like.

Further, in a communicating portion where the front side circumferential groove 26F, the rear side circumferential groove 24F, and the axial groove 26H communicate with one another, a depth of the front side circumferential groove 26F is larger than a depth of the rear side circumferential groove 24F, whereby a step portion 27B in the depth direction of the circumferential grooves is formed, similarly to the aforementioned step portion 27A.

The connecting rod bearing of the present embodiment is configured as above, and a function thereof will be described hereinafter.

During engine operation, a lubricant oil is supplied into the lubricant-oil groove 18a which is formed in a bearing inner circumferential surface of a main bearing which supports the journal 10. When the journal 10 is rotated, openings on the opposite ends of the through-hole 10a in the diametral direction which is formed in the journal 10 intermittently communicate with the lubricant-oil groove 18a. At the time of communication thereof, a lubricant-oil pressure acts on the inside of the through-hole 10a, and a lubricant-oil supply pressure also acts on the lubricant-oil passage 20 which communicates with the through-hole 10a. By the lubricant-oil supply pressure, the lubricant oil is supplied onto a sliding surface between the crankpin 12 and a connecting rod bearing 22 from the outlet port opening of the lubricant-oil passage 20 which is located in an outer circumferential surface of the crankpin 12. When the crankpin 12 is rotated and the outlet port opening of the lubricant-oil passage 20 communicates with the front side circumferential grooves 24C and 26F, the lubricant oil directly flows into the front side circumferential grooves 24C and 26F. The lubricant oil which flows therein flows in the direction of the front side circumferential end surface inside the front side circumferential groove together with foreign substances accompanying the lubricant oil.

Figure 6:
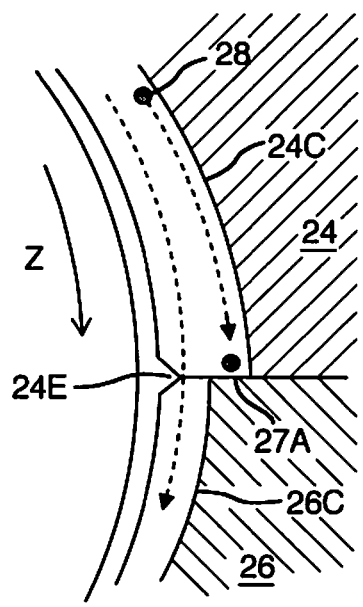
FIG. 6 is a functional explanatory view of the connecting rod bearing shown in FIG. 2.

FIG. 6 shows behaviors of the lubricant oil and a foreign substance inside the circumferential grooves by a sectional view of the communicating portion. A foreign substance 28 which has a heavy specific gravity with respect to the lubricant oil moves in the groove bottom side of the front side circumferential groove by centrifugal force. Therefore, the foreign substance 28 is sufficiently apart from a crankpin surface, and is hardly influenced by a rapid lubricant oil flow which follows the rotating crank pin surface. The step portion 27A is formed between the front side circumferential groove 24C and the rear side circumferential groove 26C, and therefore, the lubricant oil and the foreign substance 28 which flow inside the front side circumferential groove 24C are prevented from directly flowing into the rear side circumferential groove 26C. The lubricant oil and the foreign substance 28 have flow directions switched by the step portion 27A, mainly flow into the axial groove 24E, and are discharged outside the bearing from the bearing width direction end surfaces.

As described above, the foreign substance 28 is separated to the groove bottom side in the front side circumferential groove 24C, and therefore, the lubricant oil having almost no foreign substance flows to the bearing inner circumferential surface side of the front side circumferential groove 24C. The clean lubricant oil on the bearing inner circumferential surface side of the front side circumferential groove 24C directly flows into the rear side circumferential groove 26C. Accordingly, the clean lubricant oil is supplied to the bearing sliding surface of the semi-cylindrical bearing 26 without being discharged outside the bearing through the axial groove.

In the present embodiment, in the communicating portion, the depth (D2) of the rear side circumferential groove 26C in the rear side circumferential end surface 26A is preferably 0.2 to 0.9 times as large as the depth (D1) of the front side circumferential groove 24C in the front side circumferential end surface 24A.

In order to reliably reduce the speed of the foreign substances which move to the communicating portion along the groove bottom of the front side circumferential groove, the depth (D2) of the rear side circumferential groove is preferably set at 90% or less with respect to the depth (D1) of the front side circumferential groove. More specifically, the step portion with 10% or more of the depth of the front side circumferential groove preferably blocks the flow of the lubricant oil in the front side circumferential groove. Meanwhile, in order to secure a sufficient supply amount of the lubricant oil with respect to the bearing inner circumferential surface of the semi-cylindrical bearing at the downstream side, the depth (D2) of the rear side circumferential grove is preferably set as 20% or more with respect to the depth (D1) of the front side circumferential oil groove.

Further, in the present embodiment, in the communicating portion, a groove sectional area of the front side circumferential groove 24C seen from the circumferential direction of the connecting rod bearing is larger than the groove sectional area of the axial groove 24E seen from the axial direction of the connecting rod bearing.

By adopting the above configuration, the flow speeds of the lubricant oil and the foreign substances which flow relatively slowly in the front side circumferential groove 24C increase in the axial groove 24E. Therefore, the foreign substances easily flow into the axial groove 24E, and the foreign substances are easily and smoothly discharged outside the bearing from the bearing width direction end surfaces.

The depth of the front side circumferential groove becomes gradually smaller as the front side circumferential groove is apart from the front side circumferential end surface.

By adopting the configuration, the flow of the lubricant oil and the foreign substance 28 which flow inside the front side circumferential grooves 24C and 26F becomes slow toward the circumferential end surfaces, and the foreign substance is reliably forced to flow into the axial groove by following the flow of the lubricant oil. Further, the flow speeds of the lubricant oil and the foreign substance 28 at the time of approaching the axial groove are low, and therefore, the foreign substance is prevented from riding over the axial groove and flowing into the mating side semi-cylindrical bearing side, by inertia force. In the present embodiment, the depth of the rear side circumferential groove also becomes gradually smaller as the rear side circumferential groove is apart from the front side circumferential end surface.

However, the depth of the front side circumferential groove can be set at a constant depth, and the depth of the rear side circumferential groove can be also set at a constant depth.

The groove width and the depth of the circumferential groove are properly selected in accordance with the specifications of an internal combustion engine. For example, in the case of the connecting rod bearing for use in a compact internal combustion engine for a passenger car, the groove width may be set at 1 to 7 mm, and the depth may be set at 0.1 to 1 mm.

In this case, the groove width of the circumferential groove is preferably set at not less than ¼ of a bore diameter (φA) of the outlet port opening of the lubricant-oil passage 20 and not more than twice the bore diameter (φA) of the outlet port opening of the lubricant-oil passage 20. Further, the groove width of the circumferential groove is preferably set as the same as the bore diameter (φA) of the outlet port opening of the lubricant-oil passage 20.

Further, the size of the axial groove is preferably such that the groove width is less than 2 mm and the depth is 0.1 to 0.5 mm. As for the sizes of the foreign substances which are included in the lubricant oil, the length is approximately 0.1 mm at the maximum, and the dimension of the axial groove is determined with consideration given to the foreign substance discharging property.

In the present embodiment, as a preferred example, the front side circumferential groove 24C and the front side circumferential groove 26F, the rear side circumferential groove 24F and the rear side circumferential groove 26C, and the axial groove 24E and the axial groove 26H are formed into line-symmetrical shapes around the axial line of the connecting rod bearing 22, respectively.

By adopting the configuration, commonality of components of the semi-cylindrical bearings 24 and 26 can be achieved. However, the present invention is not limited to the present embodiment, and the front side circumferential groove 24C and the front side circumferential groove 26F, the rear side circumferential groove 24F and the rear side circumferential groove 26C, and the axial groove 24E and the axial groove 26H may be formed into asymmetrical shapes with respect to the bearing center line, respectively. More specifically, the front side circumferential groove 24C and the front side circumferential groove 26F, the rear side circumferential groove 24F and the rear side circumferential groove 26C, and the axial groove 24E and the axial groove 26H do not have to be formed into the same sizes, and may have different circumferential lengths, groove widths and depths, in the range in which the function of the present invention is kept.

Embodiment 2

Figure 7:
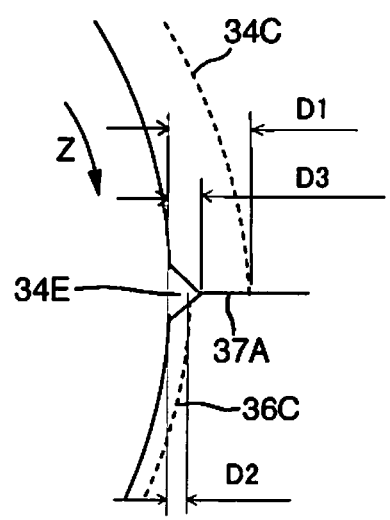
FIG. 7 is a view of a communicating portion of a connecting rod bearing according to embodiment 2 of the present invention seen from an axial direction.

FIG. 7 shows a sectional view of a communicating portion in regard with embodiment 2 of the present invention. In the embodiment, in the communicating portion, the depth (D1) of the front side circumferential groove, the depth (D2) of the rear side circumferential groove, and a depth (D3) of the axial groove satisfy the following relational expression:

the depth (D1) of the front side circumferential groove>the depth (D3) of the axial groove>the depth (D2) of the rear side circumferential groove.

In embodiment 1, the dimensional relationship of the depth (D3) of the axial groove and the depth (D2) of the rear side circumferential groove is opposite from the above, and the depth (D3) of the axial groove<the depth (D2) of the rear side circumferential groove is established. When the depth (D2) of the rear side circumferential groove is larger than the depth (D3) of the axial groove, some of the foreign substances, which flow in the groove bottom side of the front side circumferential groove and reach the communicating portion, flow into the rear side circumferential groove before reaching the axial groove.

However, by adopting the configuration of embodiment 2, the lubricant oil and the foreign substances which flow in the groove bottom side of the front side circumferential groove 34C are blocked by a step portion 37A, and thereafter, flow into an axial groove 34E first. Accordingly, the foreign substances are more easily discharged outside the bearing through the axial groove 34E than in embodiment 1, and hardly flow into a rear side circumferential groove 36C, and therefore, the foreign substance discharging effect is improved.

Embodiment 3

Figure 8:
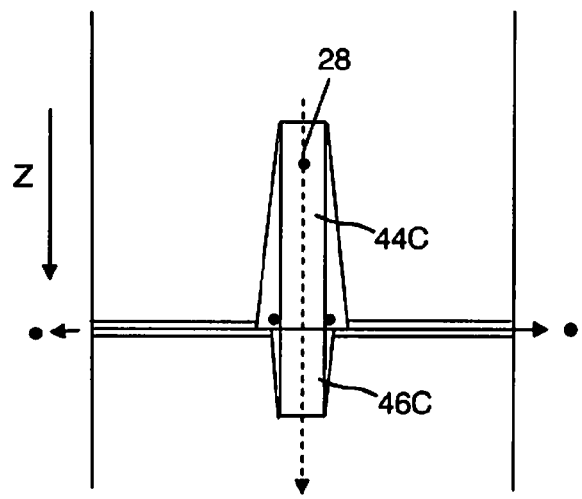
FIG. 8 is a functional explanatory view of a communicating portion of a connecting rod bearing according to embodiment 3 of the present invention seen from a bearing inner circumferential surface side.
Figure 9:
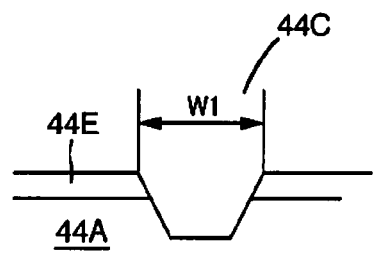
FIG. 9 is a plan view showing a front side circumferential end surface of the connecting rod bearing shown in FIG. 8.
Figure 10:
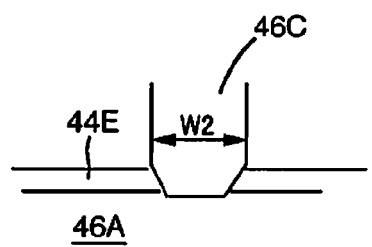
FIG. 10 is a plan view showing a rear side circumferential end surface of the connecting rod bearing shown in FIG. 8.
Figure 11:
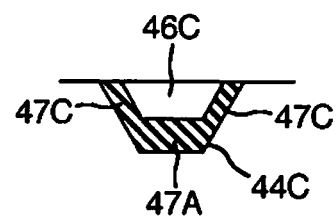
FIG. 11 is a view of a rear side circumferential groove seen from a front side circumferential groove of the connecting rod bearing shown in FIG. 8.

FIGS. 8 to 11 show embodiment 3. FIG. 8 is a view of circumferential grooves and an axial groove seen from a bearing inner circumferential surface side. FIG. 9 is a view of a front side circumferential end surface seen from a circumferential direction. FIG. 10 is a view of a rear side circumferential end surface seen from the circumferential direction. FIG. 11 shows a state in which the rear side circumferential groove is seen from the front side circumferential groove.

In the present embodiment, in a communicating portion, a groove width (W1) of a front side circumferential groove 44C is larger than a groove width (W2) of a rear side circumferential groove 46C, whereby a step portion in the groove width direction of the circumferential groove is formed (see FIG. 11).

By adopting the configuration, a step portion 47C in the groove width direction is formed in addition to the step portion 47A in the depth direction of the circumferential groove, and therefore, the effect of also blocking foreign substances which move along the side wall of the front side circumferential groove is generated. Thereby, the foreign substance discharging effect is more improved.

In the present embodiment, the side wall of the circumferential groove is a slant surface, and the groove width increases toward the bearing inner circumferential surface from the groove bottom. Accordingly, the sectional shape of the circumferential groove is a trapezoidal shape. In embodiments 1 and 2, the sectional shapes of the circumferential grooves are rectangular shapes, but in embodiment 3, the rate at which the sectional area of the circumferential groove increases toward the circumferential end surface is higher. Accordingly, the speed of the foreign substance which flows into the front side circumferential groove of embodiment 3 becomes lower toward the circumferential end surface, and the foreign substance easily flows into the axial groove. Accordingly, the foreign substance discharging effect is improved.

In this case, in regard with the sectional shape of the circumferential sectional groove, while the embodiment of the trapezoidal shape is shown, the sectional shape can be made to be any sectional shapes such as a semicircular shape and a triangular shape, besides the trapezoidal shape. As long as the step portion having a foreign substance discharging effect is formed, the circumferential groove with any sectional shape can be applied.

Embodiment 4

Figure 12:
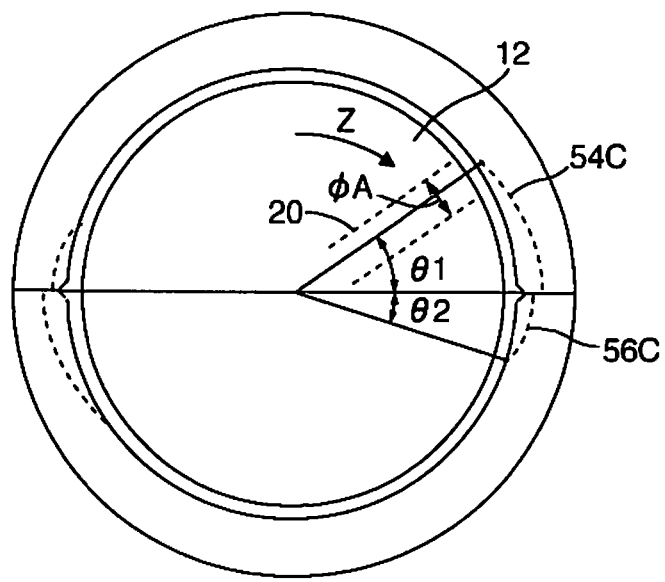
FIG. 12 is an elevation view of a connecting rod bearing according to embodiment 4 of the present invention.
Figure 13:
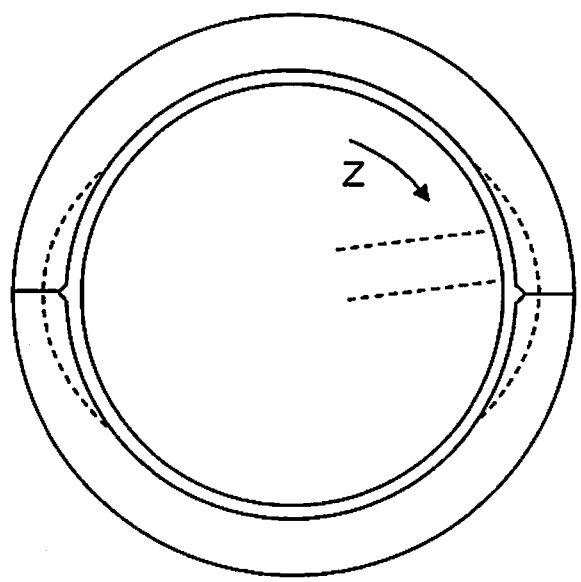
FIG. 13 is an elevation view of a connecting rod bearing according to a comparative example.
Figure 14:
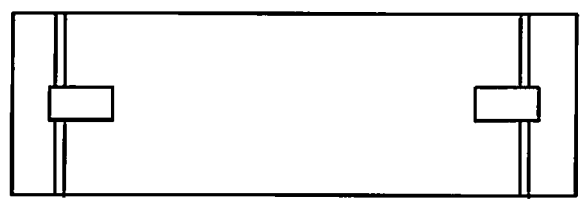
FIG. 14 is a plan view of a semi-cylindrical bearing according to the comparative example shown in FIG. 13 seen from an inner circumferential surface side.

FIG. 12 shows embodiment 4. A central angle ($\theta 1$) at which a front side circumferential groove 54C is formed is larger than a central angle ($\theta 2$) at which a rear side circumferential groove 56C is formed.

When the central angle ($\theta 1$) at which the front side circumferential groove is formed is large, the probability becomes high that the front side circumferential groove catches the foreign substance which is discharged from the outlet port opening of the lubricant-oil passage 20 in the crankpin 12 outer circumferential surface. More specifically, the foreign substance is caught in front of the axial groove which is the foreign substance discharge passage, and therefore, the foreign substance discharging effect is improved. Further, when the central angle ($\theta 1$) at which the front side circumferential groove is formed is large, the time in which the foreign substance flows in the front side circumferential groove becomes long, the moving speed of the foreign substance becoming low, and the foreign substance being easily discharged from the axial groove.

When the central angle ($\theta 2$) at which the rear side circumferential groove is formed is small, the probability becomes low that the foreign substance is discharged from the outlet port opening of the lubricant-oil passage 20 in the crankpin 12 outer circumferential surface into the rear side circumferential groove. The rear side circumferential groove is located downstream of the axial groove which is a foreign substance discharge passage, and therefore, the foreign substance which is discharged to the rear side circumferential groove is not discharged from the axial groove. More specifically, the possibility of the foreign substance being discharged to the rear side circumferential groove is suppressed to be low, whereby the foreign substance discharging effect is improved as a result. Further, even if the central angle ($\theta 2$) at which the rear side circumferential groove is formed is small, the effect of supplying the oil from the front side circumferential groove to the bearing inner circumferential surface at the downstream side can be sufficiently kept.

It is preferable to make the central angle ($\theta 1$) of the front side circumferential groove large so that the circumferential length of the front side circumferential groove is made larger than the bore diameter ($\phi A$) of the outlet port opening of the lubricant-oil passage 20. Further, it is preferable to make the circumferential length of the front side circumferential groove larger than twice the bore diameter ($\phi A$) of the outlet port opening of the lubricant-oil passage 20.

It is preferable to make the central angle ($\theta 2$) of the rear side circumferential groove small so that the circumferential length of the rear side circumferential groove is made smaller than the bore diameter ($\phi A$) of the outlet port opening of the lubricant-oil passage 20. However, in order to secure supply of the lubricant oil to the bearing sliding surface ahead of the rear side circumferential groove, the circumferential length of the rear side circumferential groove is preferably set at not less than half of the bore diameter ($\phi A$) of the outlet port opening of the lubricant-oil passage 20.

Further, in the present invention, a crush relief may be formed in the bearing inner circumferential surface adjacent to each of the circumferential end surfaces of a pair of semi-cylindrical bearings. In this case, the crush relief refers means a bearing wall thickness reduced region which is formed by removing a bearing wall at the portion near the circumferential end surfaces of a pair of semi-cylindrical bearings, and has a curvature center different from the curvature center of the bearing inner circumferential surface (indicates the region in which the thickness is gradually reduced toward the circumferential end surface, and is as specified in SAE J506 (refer to item 3.26, and item 6.4), DIN 1497, §3.2).

The invention claimed is:

1. A connecting rod bearing for a crankshaft of an internal combustion engine which rotatably supports a crankpin of a crankshaft having an internal lubricant-oil passage,
   wherein the connecting rod bearing comprises a pair of semi-cylindrical bearings, the pair of semi-cylindrical bearings each having a front side circumferential end surface positioned at a front side with respect to a rotational direction of the crankpin, and a rear side circumferential end surface positioned at a rear side, the front side circumferential end surface of one of the semi-cylindrical bearings and the rear side circumferential end surface of the other one of the semi-cylindrical bearings abutting on each other,
   in at least one of the semi-cylindrical bearings, a front side circumferential groove being formed along a bearing inner circumferential surface from the front side circumferential end surface within a range of a maximum central angle of 45 degrees,
   in the opposed semi-cylindrical bearing, a rear side circumferential groove which communicates with the front side circumferential groove being formed along a bearing inner circumferential surface from the rear side circumferential end surface within a range of a maximum central angle of 45 degrees,
   an axial groove which communicates with the front side circumferential groove and the rear side circumferential groove being formed throughout an entire length of a width in an axial direction along the bearing inner circumferential surface, and
   in a communicating portion where the front side circumferential groove, the rear side circumferential groove, and the axial groove communicate with one another, a depth of the front side circumferential groove being larger than a depth of the rear side circumferential groove, whereby a step portion in a depth direction of the circumferential grooves is formed.

2. The connecting rod bearing according to claim 1, wherein in the communicating portion, the depth of the rear side circumferential groove is 0.2 to 0.9 times as large as the depth of the front side circumferential groove.

3. The connecting rod bearing according to claim 1,
wherein in the communicating portion, the depth of the front side circumferential groove, the depth of the rear side circumferential groove, and a depth of the axial groove satisfy the following relational expression:
the depth of the front side circumferential groove>the depth of the axial groove>the depth of the rear side circumferential groove.

4. The connecting rod bearing according to claim 1,
wherein in the communicating portion, a groove sectional area of the front side circumferential groove seen from a circumferential direction of the connecting rod bearing is larger than a groove sectional area of the axial groove seen from an axial direction of the connecting rod bearing.

5. The connecting rod bearing according to claim 1,
wherein in the communicating portion, a groove width of the front side circumferential groove is larger than a groove width of the rear side circumferential groove, whereby a step portion in a groove width direction of the circumferential grooves is formed.

6. The connecting rod bearing according to claim 1,
wherein a central angle at which the front side circumferential groove is formed is larger than a central angle at which the rear side circumferential groove is formed.

7. The connecting rod bearing according to claim 1,
wherein the axial groove is formed by cutting at least either one of a bearing inner circumferential surface side of the front side circumferential end surface in which the front side circumferential groove is formed, or a bearing inner circumferential surface side of the rear side circumferential end surface in which the rear side circumferential groove is formed.

8. The connecting rod bearing according to claim 1,
wherein the depth of the front side circumferential groove becomes gradually smaller as the front side circumferential groove is apart from the front side circumferential end surface.

9. The connecting rod bearing according to claim 1,
wherein the front side circumferential groove is formed in only one of the semi-cylindrical bearings.

10. The connecting rod bearing according to claim 1,
wherein the front side circumferential grooves are formed in both of the semi-cylindrical bearings.

11. An internal combustion engine, comprising:
the connecting rod bearing according to claim 1.

* * * * *